Jan. 28, 1964 R. G. SCHONBERG 3,119,968
"Q"-REDUCING CIRCUIT STABILIZING PEAK CHARGING VOLTAGE
OF PULSE FORMING NETWORK EMPLOYING CONTROLLED
RESONANT CHARGING INDUCTOR
Filed May 15, 1961
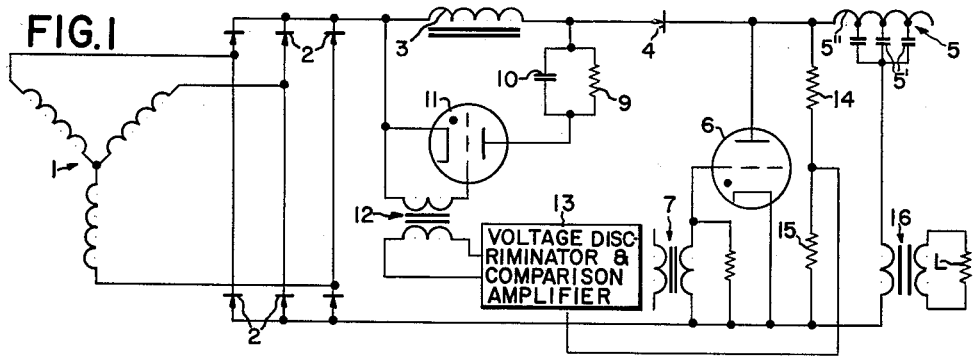
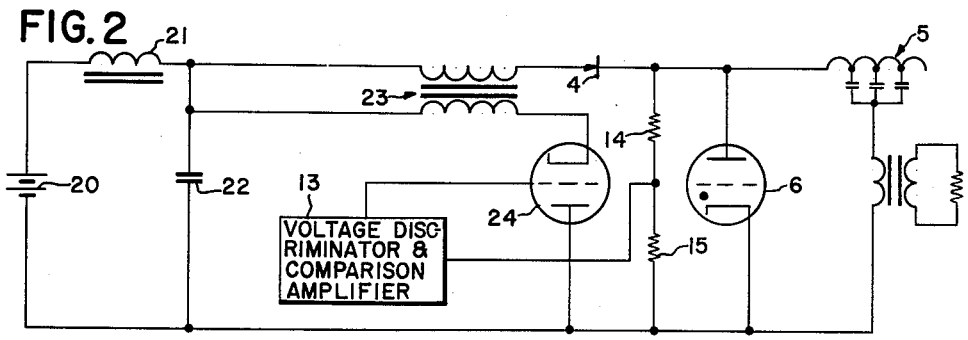
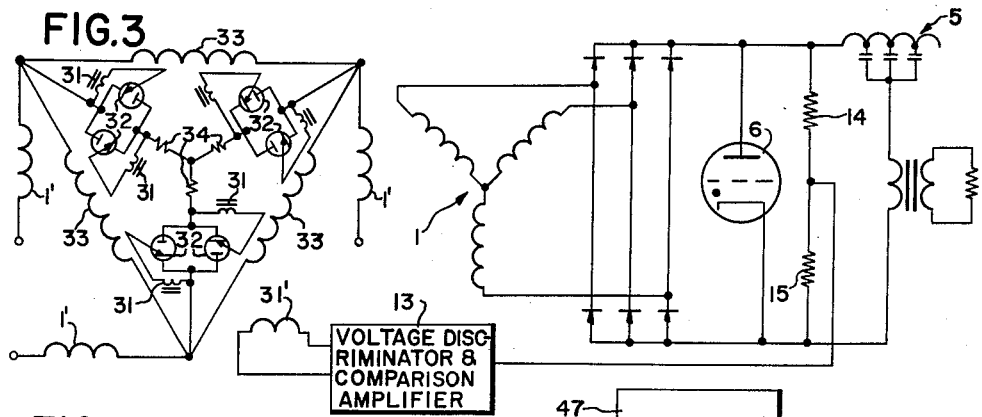
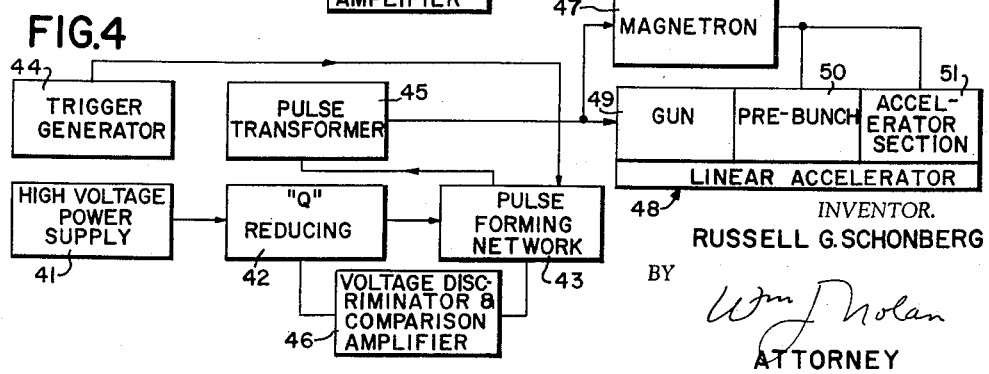
INVENTOR.
RUSSELL G. SCHONBERG
BY
ATTORNEY 3,119,968
"Q"-REDUCING CIRCUIT STABILIZING PEAK CHARGING VOLTAGE OF PULSE FORMING NETWORK EMPLOYING CONTROLLED RESONANT CHARGING INDUCTOR
Russell G. Schonberg, Palo Alto, Calif., assignor to Varian Associates, Palo Alto, Calif., a corporation of California
Filed May 15, 1961, Ser. No. 110,226
16 Claims. (Cl. 328—67)

The present invention relates generally to high power pulse system voltage regulation and control and, in particular, to a novel "Q"-reducing circuit which will stabilize the peak charging voltage of a pulse-forming network.

The "Q"-reducing circuit of the present invention has advantages over more complex and expensive systems that have been used in the past to regulate power level in a pulsing system. For example, electro-mechanical systems in the A.C. primary windings such as motor driven variable voltage transformers or electronic A.C. primary regulation devices such as saturable reactors have been used. Other systems such as secondary winding, high voltage D.C. type regulation devices, for exampe, charging triodes, thyratron charging tube, high voltage hard tube regulators, and saturable reactor charging choke regulation have also been considered. These and other devices have been successfully used in the past; however, these systems are complex and uneconomical when compared with the present "Q"-reducing system. Further, the novel "Q"-reducing circuit of the present invention provides a function in addition to the regulation function, namely, control. This has the advantage in that the components necessary to construct a "Q"-reducing system of the present type which will provide good regulation and control are found within the existing state of the art and no development, in terms of components, is required.

The present system may be used in linear accelerators which vary in average modulator power from 15 to 200 kilowatts, and varying in peak power from 10 to 100 megawatts. This is an indication of the versatility of the novel "Q"-reducing circuit and shows the practicability of the circuit.

The object of the present invention is to provide a simple technique of regulating the amplitude of charge voltage being supplied to a pulse-forming network at a known adjustable level and to control the amplitude of the charge voltage over the upper voltage range.

The main feature of the present invention is the provision of a "Q"-reducing circuit, comprising a switch controlling a resonant charging inductor having a dissipative element in series with the switch to allow stored energy in the inductor to be drained. The switch is triggered by means of a feedback monitor signal from the pulse-forming network.

Another feature of the present invention is the provision of a second winding associated with the resonant charging inductor to form a transformer to couple unused energy from the charging inductor to a storage means thereby preserving unused energy from the charging inductor.

Another feature of the present invention is the provision whereby the "Q"-reducing circuit may be located in either the primary winding or the high voltage D.C. output of the power supply.

Still another feature of this invention is the provision of a novel "Q"-reducing circuit in the pulse-forming stage of a high power linear accelerator.

These and other features of the present invention will become apparent upon a perusal of the following specification and drawings wherein, FIG. 1 is a schematic drawing showing a circuit of a "Q"-reducing network and an associated pulse-forming network, FIG. 2 is a schematic drawing showing a circuit of another embodiment of the present invention, FIG. 3 is a schematic drawing showing the circuit of another embodiment of the present invention, and FIG. 4 shows a linear accelerator system in block diagram form incorporating the novel "Q"-reducing circuit of the present invention.

Referring now to FIG. 1, an unregulated, unfiltered, three-phase, full wave rectified power supply voltage is provided through secondary transformer windings 1 and diode rectifiers 2 through a charging inductor 3, and a diode 4 to a pulse-forming network 5. Pulse-forming network 5 comprises a network of capacitors 5' shunted across a series inductor 5''. Across charging inductor 3 is connected the novel "Q"-reducing circuit comprising shunting resistor 9 connected in parallel with capacitor 10 and in series with the plate of an electron tube switch 11 as, for example, a thyratron. The cathode of thyratron 11 is connected to the power supply side of charging inductor 3. The control electrode of thyratron 11 is connected to the secondary winding of transformer 12. The primary winding of transformer 12 is connected to a voltage discriminator and pulse amplifier comparison network 13, hereafter called simply "comparison network", shown in block diagram form. The input of comparison network 13 is connected to the lead between a pair of resistors 14 and 15 which form a voltage divider network. Resistor 14 is connected to the pulse-forming network 5 and resistor 15 to the negative side of the power supply. An output transformer 16 is provided to couple the output from the pulse-forming network to a suitable load L. The means for discharging the pulse-forming network to the load L is a thyratron switch 6, controlled by an input pulse through transformer 7.

During operation, the power supply voltage charges pulse-forming network 5 through charging inductor 3 and diode 4. Charging inductor 3 and pulse-forming network 5 act as a series-resonance circuit which can supply a charge of approximately $2 \times B^+$ to the pulse-forming network 5. The desired voltage level or charge on the pulse-forming network 5 is obtained by setting a reference voltage of comparison network 13. The feedback from the pulse-forming network through the voltage divider network 14 and 15 is monitored and compared with a reference voltage produced and supplied by comparison network 13. When the monitored feedback signal voltage exceeds the reference signal voltage, comparison network 13 feeds a pulsed signal across transformer 12 to the grid of the thyratron 11 which causes the tube to fire. This, in effect, "closes the switch" in the "Q"-reducing circuit. The current stored in charge inductor 3 is diverted from the pulse-forming network 5 to the shunting resistor 9 and capacitor 10. The charging inductor 3, in series with capacitor 10, constitutes a series-resonant circuit which is critically damped by resistor 9. This reduces the "Q" of the charging inductor 3 to a value of 1 (power stored in charging inductor 3=power loss in charging inductor 3). The choice of sizes of resistor 9 and capacitor 10 provides a method of changing the discharge rate of the stored energy in inductor 3 in order to prepare for the next charge cycle to prevent residual stored energy from circulating in the "Q"-reducing network. The pulse-forming network 5 is isolated from charging inductor 3 during the "Q" reduction by diode 4. When the thyratron switch 6 is triggered by a trigger generator (not shown), charge voltage stored in pulse-forming network 5 is removed through switch 6 and supplied across transformer 16 to load L. As was previously stated, comparison amplifier 13 supplies only a pulse or spike of voltage to the control electrode of switch thyratron 11. The high voltage on the plate of switch thyratron 11 will keep the tube firing. When the pulse-forming network is discharged diode 4 will conduct, feeding the charge voltage from charging inductor 3 to pulse-forming network 5 instead of dissipating it into resistor 9. This will stop operation of thyratron 11 or, in effect, "open the switch" in the "Q"-reducing circuit thereby allowing the next charge cycle to begin. The discharge rate of the inductance stored energy may be varied as a function of parameter choices of capacitor 10, inductor 3 and resistor 9 while maintaining critical damping. It is noted that the amplitude of the reference voltage can be changed to regulate the charge of the pulse-forming network from 55 to 100% of the input source.

A second embodiment of the present invention is shown in FIG. 2. A filtered high positive potential from power supply 20 is fed to pulse-forming network 5 through power supply filter choke 21, the primary of transformer 23 and diode 4. When the monitor signal from the voltage divider network of resistors 14 and 15 exceeds the reference voltage in comparison amplifier 13, a steady signal is fed to the grid of the triode 24, and the triode 24 begins to operate. In the present embodiment, unused energy from the primary of transformer 23, which serves as the charging inductor for the pulse-forming network 5, is coupled to a storage capacitor 22 by means of the secondary winding of transformer 23 instead of being dissipated during operation of triode 24. A triode is used in the present embodiment in place of a thyratron because a triode can be turned on or off, especially if high voltage remains in the plate of the switch. Filter choke 21 is used to supply a relatively smooth high potential in order to gain better advantage of storage capacitor 22. It is noted that the polarity of triode 24 can be reversed. This will depend upon the turns ratio of the secondary to primary in transformer 23.

FIG. 3 shows another embodiment of the present invention wherein the "Q"-reducing circuit is located in the primary windings 1' or A.C. side of the power supply. Voltage from the comparison network 13 is fed across the primary 31' to a plurality of secondaries 31 to trigger the ignitrons 32 which act as the switch to shunt the stored energy from charging inductors 33 through the ignitrons 32 to be dissipated in resistors 34. One advantage in the present embodiment is that there is no need for an extra diode such as diode 4 in FIG. 1 between the charging inductor 33 and pulse-forming network 5. Also, standard components are available to control the lower voltages in the primary. The high voltage found in the secondary winding 1 of the power supply could reach very high levels and create a need for special components to handle the high voltage found there.

FIG. 4 shows, in block diagram form, a linear accelerator apparatus incorporating the "Q"-reducing circuit of the present invention. A high voltage power supply 41 feeds a charge voltage through the "Q"-reducing network 42 to the pulse-forming network 43. A pulse from the pulse-forming network is initiated by firing of the trigger generator 44. The pulse-forming network 43 is fired, causing current to flow into the pulse transformer 45. The "Q"-reducing circuit 42 operates to regulate and control the point to which the voltage on the pulse-forming network 43 charges. This point is controlled by the voltage discriminator and pulse comparison amplifier 46. A monitor signal from the pulse-forming network 43 is compared with a reference voltage in the comparison amplifier 46. When the monitor voltage exceeds a preset level, a trigger signal is sent to the "Q"-reducing circuit 42 to close a switch in that circuit which drains the energy from a charging inductor in the "Q"-reducing network 42. This stops the charge from further adding stored energy to the pulse-forming network 43. The pulse voltage from the pulse-forming network 43 is applied to the magnetron 47 which produces a stabilized R.F. output. This output is divided, a portion going to the accelerator section 51 of a linac 48 and a portion to the prebuncher cavity section 50 of the linac to produce a tight bunch of electrons. The gun 49 of the linac 48 is pulsed on by a connection to the same pulse transformer 45 as the magnetron 47 is connected. This enables the gun 49, which is a high impedance device, to be pulsed in parallel with a low impedance load so that a good pulse shape may be obtained by the pulse transformer. A linear accelerator of this type is shown in the co-pending application of L. E. Brown et al., application Serial No. 744,608, entitled "Linear Particle Accelerator Apparatus," filed June 25, 1958.

Such a device is presently at use on a linear accelerator for radiographing solid fuel missiles. The linac is a ten million electron volt device with the X-ray convertor that requires a high degree of stability to the driving R.F. source, in this case, a magnetron. The linac produces ten million electron volt electrons which are converted and produce a high intensity, well collimated X-ray output. The requirement for extremely good regulation and control in terms of the pulse voltage applied to the magnetron by a pulse transformer is necessary in order to keep the beam spot-size an energy constant over long and short times.

The "Q"-reducing network in this case is working with a line voltage that varies up to 25% and maintains the voltage to the magnetron constant to approximately one-half of 1%. The main advantage of this system is that it is relatively simple and inexpensive.

Another purpose for the "Q"-reducing circuit is radar systems using doppler radars where close regulation and knowledge of phase shift is necessary. By use of the "Q"-reducing system, the peak pulse voltage can be regulated so that the power level is constant from pulse to pulse within very tight limits and the pulse flat top is improved, as it is easier to flatten a pulse top when the pulse is not varying in amplitude. In essence, this would then produce greater phase stability for the system.

Another purpose for the novel "Q"-reducing circuit would be on an amplitude echo system type of radar wherein the pulse power level and the pulse flat top are both important to produce an accurate ranging system.

If it would become desirable to use a klystron in place of the magnetron 47, an R.F. driver supplying the klystron could be provided. The driver would be pulsed on by the trigger generator 44 which pulses the pulse-forming network 43. The output from the pulse transformer would then be supplied only to the gun of the linac.

While there have been described and illustrated specific embodiments of the invention, it will be obvious that various changes and modifications may be made therein without departing from the scope of the invention which should be limited only by the scope of the appended claims.

What is claimed is:

1. A "Q"-reducing circuit for a pulse-forming network comprising, a pulse-forming network, a charging inductor forming a series-resonance network with said pulse-forming network, a source of charging current to said charging inductor and said pulse-forming network, switch means across said charging inductor, means for removing the current stored in said charging inductor, feedback means for feeding back from said pulse-forming network to said switch a signal for closing said switch at a predetermined amplitude of charge on said pulse-forming network thereby shunting said current stored in said charging inductor to said removing means thereby removing said charge source from said pulse-forming network to control the voltage amplitude thereof and means for producing critical damping of said "Q"-reducing circuit.

2. The "Q"-reducing circuit of claim 1 wherein said removing means includes a resistor in series with said charging inductor and switch, a capacitor connected in parallel with said resistor, said inductor and capacitor forming a series-resonance circuit critically damped by said resistor to reduce the "Q" of said inductor to a value of 1.

3. The "Q"-reducing circuit of claim 1 wherein said removal means includes a second inductor, said charging inductor and said second inductor forming a transformer, a storage capacitor connected to the positive side of said second inductor, said switch means connected to the negative side thereof such that when said switch is closed the energy stored in said charging inductor will be coupled through said second inductor to said storage capacitor.

4. The "Q"-reducing circuit of claim 1 wherein said switch includes an electron tube including a control electrode, said feedback means including means for monitoring the voltage in said pulse-forming network, means for comparing said monitored voltage with a reference voltage and means for supplying a signal to the control electrode of said electron tube thereby initiating operation thereof.

5. The "Q"-reducing circuit of claim 4 wherein said electron tube includes a thyratron, said thyratron being initiated by a pulsed signal from said comparison means.

6. The "Q"-reducing circuit of claim 4 wherein said electron tube includes a triode, the operation of said triode being controlled by a steady signal source from said comparison means.

7. The "Q"-reducing circuit of claim 4 wherein said feedback means includes a voltage divider network connected to said pulse-forming network for monitoring the voltage thereon, a voltage discriminator and pulse amplifier comparison network for providing a reference voltage and comparing said reference voltage with the monitor signal voltage, said voltage discriminator and pulse amplifier comparison network feeding a signal to the control electrode of said electron tube when said monitored signal voltage exceeds said reference voltage.

8. A "Q"-reducing circuit comprising, a pulse-forming network, a charging inductor forming a series-resonance network with said pulse-forming network, a source of current to said charging inductor and said pulse-forming network, switch means across said charging inductor, said switch means including a thyratron, a resistor in series with said charging inductor and said thyratron, a capacitor connected in parallel with said resistor, feedback means from said pulse-forming network for initiating operation of said thyratron at a predetermined amplitude, said feedback means includes a voltage divider network connected to said pulse-forming network for monitoring the voltage thereon, a voltage discriminator and pulse amplified comparison network for providing a reference voltage and comparing said reference voltage with the monitor signal voltage, said voltage discriminator and pulse amplifier comparison network feeding a signal to the control electrode of said thyratron when said monitored signal voltage exceeds the reference voltage to initiate operation of said thyratron closing said switch thereby shunting said current stored in said charging inductor through said resistor, said charging inductor and said capacitor forming a series-resonance circuit critically damped by said resistor to reduce the "Q" of said charging inductor to a value of 1 thereby removing said current source from said pulse-forming network.

9. A "Q"-reducing circuit comprising, a pulse-forming network, a charging inductor forming a series-resonance network with said pulse-forming network, said charging inductor further acting as a primary winding of a transformer, a source of current to said charging inductor and said pulse-forming network, switch means across said charging inductor, said switch means including an electron tube having a control electrode, a second inductor acting as the secondary winding of said transformer in series with said charging inductor and said electron tube, a storage capacitor connected to the positive side of said second inductor, said electron tube connected to the negative side thereof, feedback means from said pulse-forming network for initiating operation of said electron tube, said feedback means including a voltage divider network connected to said pulse-forming network for monitoring the voltage thereon, a voltage discriminator and pulse amplifier comparison network for providing a reference voltage and comparing said reference voltage with the monitor signal voltage from said voltage divider, said comparison network feeding a signal to the control electrode of said electron tube when said monitor signal voltage exceeds said reference voltage thereby initiating operation of said electron tube closing said switch thereby causing the energy stored in said charging inductor to be coupled through said second inductor and onto said storage capacitor.

10. A "Q"-reducing circuit comprising a pulse-forming network, a plurality of charging inductors forming a series-resonance network with said pulse-forming network, a source of current to said charging inductor and said pulse-forming network, said source of current including a transformer, said charge inductor being positioned in the primary winding side of said transformer, switch means across said charging inductors, said switch means including ignitron tubes having a dissipative load in series with said charging inductor and said switch means, feedback means from said pulse-forming network for initiating operation of said ignitrons, said feedback means including a voltage divider network connected to said pulse-forming network for monitoring the voltage thereon, a voltage discriminator and pulse amplified comparison network for providing a reference voltage and comparing said reference voltage with the monitor signal voltage, said comparison network feeding a signal to the ignitron tubes when said monitor signal voltage exceeds said reference voltage, thereby closing said switch and shunting current stored in said charging inductors to said dissipative means thereby removing the current source from the pulse-forming network.

11. In combination, a particle accelerator, machine for accelerating charged particles, an R.F. driver for providing an R.F. driving source for said particle accelerator, a pluse-forming network for forming and supplying a pulsed voltage to said R.F. driver, a "Q"-reducing circuit for controlling and regulating the output pulse voltage of said pulse-forming network, said "Q"-reducing circuit including a charging inductor forming a series-resonance network with said pulse-forming network, a source of current to supply a charge to said charging inductor and said pulse-forming network, switch means across said charging inductor, means for dissipating the charge current stored in said charging inductor, feedback means for feeding back from said pulse-forming network to said switch a signal for closing said switch at a predetermined amplitude of charge on said pulse-forming network thereby shunting said current stored in said charging inductor to said dissipating means thereby removing said charge source from said pulse-forming network to contol the charge voltage amplitude thereof and means for producing critical damping of said "Q"-reducing circuit.

12. The combination of claim 11 wherein said particle accelerator includes a linear particle accelerator, a pulse transformer for coupling the pulse voltage from said pulse forming network to said R.F. driver and to the electron gun of said linear particle accelerator.

13. The combination of claim 12 wherein said R.F. driving source includes a magnetron, said magnetron providing an output source for said linear accelerator, a portion of said source coupled to the prebunching portion of said linear accelerator while the remainder of said R.F. source coupled to the accelerator section of said linear accelerator.

14. In combination a linear particle accelerator device including, a linear particle accelerator for accelerating charged particles, a magnetron for providing an R.F. driving source for said linear particle accelerator, a pulse forming network for forming and supplying a pulsed voltage, a pulse transformer for coupling said pulsed voltage to said magnetron and to the electron gun of said linear accelerator, a "Q"-reducing circuit for controlling and regulating the output pulse voltage of said pulse forming network, said "Q"-reducing circuit including a charging inductor forming a series-resonance network with said pulse forming network, a source of charging current to said charging inductor and said pulse forming network, switch means across said charging inductor, means for removing the current stored in said charging inductor, feed back means for feeding back a signal from said pulse forming network to said switch for closing said switch at a predetermined charge on said pulse forming network thereby shunting the current stored in said charging inductor to said removing means thereby removing said charge source from said pulse forming network to control the amplitude thereof and means for producing critical damping of said "Q"-reducing circuit.

15. In combination, a particle accelerator machine for accelerating charged particles, a klystron for providing an R.F. source for said particle accelerator, an R.F. driver for providing an R.F. input to said klystron, a pulse forming network for forming and supplying a pulse voltage to said linear accelerator, a "Q"-reducing circuit for controlling and regulating the output pulse voltage of said pulse forming network, said "Q"-reducing circuit including a charging inductor forming a series resonance network with said pulse forming network, a source of current to supply a charge to said charging inductor in said pulse forming network, switch means across said charging inductor, means for dissipating the charged current stored in said charging inductor, feedback means for feeding a signal from said pulse forming network to said switch for closing said switch at a predetermined amplitude of charge on said pulse forming network thereby shunting said current stored in said charging inductor to said dissipating means thereby removing said charged source from said pulse forming network to control the charge voltage amplitude thereof, a trigger generator for triggering the pulse from said pulse forming network to said linear accelerator, said trigger generator further supplying a pulse to said R.F. driver such that the outputs from said klystron and said pulse forming network reach the linear accelerator at the same instant.

16. A "Q"-reducing circuit for a pulse-forming network comprising, a pulse-forming network, a charging inductor forming a series-resonance network with said pulse-forming network, a source of charging current to said charging inductor and said pulse-forming network, switch means across said charging inductor, means for removing the current stored in said charging inductor, feedback means for feeding back from said pulse-forming network to said switch a signal for closing said switch at a predetermined amplitude of charge on said pulse-forming network thereby shunting said current stored in said charging inductor to said removing means thereby removing said charge source from said pulse-forming network to control the voltage amplitude thereof, said source of current including a transformer, and said removing means and said switch being located in the primary winding side of said transformer thereby removing the need for high voltage components to be used in said charging inductor removing means and said switch.

References Cited in the file of this patent
UNITED STATES PATENTS
2,832,928     Arnold et al. _____ Apr. 29, 1958